United States Patent
Li

(10) Patent No.: US 12,494,861 B2
(45) Date of Patent: Dec. 9, 2025

(54) OPTICAL RECEIVING DEVICE AND OPTICAL MODULE

(71) Applicant: SHUNYUN TECHNOLOGY (ZHONG SHAN) LIMITED, Zhongshan (CN)

(72) Inventor: Chun-Feng Li, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 412 days.

(21) Appl. No.: 18/093,791

(22) Filed: Jan. 5, 2023

(65) Prior Publication Data

US 2024/0171296 A1 May 23, 2024

(30) Foreign Application Priority Data

Nov. 21, 2022 (CN) .......................... 202211452339.6

(51) Int. Cl.
*H04J 14/02* (2006.01)

(52) U.S. Cl.
CPC .............................. *H04J 14/0307* (2023.08)

(58) Field of Classification Search
CPC .... H04J 14/0307; H04B 10/60; G02B 6/4215
See application file for complete search history.

(56) References Cited

U.S. PATENT DOCUMENTS

| | | | | |
|---|---|---|---|---|
| 11,181,705 | B2 * | 11/2021 | Chen | G02B 6/4281 |
| 2009/0052909 | A1 | 2/2009 | Hino et al. | |
| 2014/0112618 | A1 | 4/2014 | Chang | |
| 2021/0149129 | A1 * | 5/2021 | Wei | G02B 6/4246 |
| 2023/0333332 | A1 * | 10/2023 | Tu | H04B 10/60 |
| 2024/0259107 | A1 * | 8/2024 | Sun | H04B 10/11 |

FOREIGN PATENT DOCUMENTS

| | | |
|---|---|---|
| CN | 106814423 A | 6/2017 |
| CN | 107065083 A | 8/2017 |
| CN | 109802745 | 5/2019 |
| CN | 210376778 U | 4/2020 |
| CN | 109802745 B | 5/2020 |
| CN | 210514705 U | 5/2020 |
| CN | 115343808 A | 11/2022 |
| CN | 115343809 A | 11/2022 |
| KR | 20200139636 A | 12/2020 |

* cited by examiner

*Primary Examiner* — Chandrahas B Patel
(74) *Attorney, Agent, or Firm* — ScienBiziP, P.C.

(57) ABSTRACT

An optical receiving device includes a substrate; an optical receiving chip arranged on the substrate; an optical demultiplexer arranged on the substrate and used to distinguish optical signals into optical signals with different wavelengths; an optical transmission structure optically coupled to the optical demultiplexer and providing the optical signals to the optical demultiplexer; and an optical fiber array fused with optical fibers of the optical demultiplexer, and transmitting the optical signals with different wavelengths to the optical receiving chip. According to the optical receiving device, the optical fiber cable of the optical demultiplexer is directly fused with the optical fiber cable of the optical fiber array, so that the optical signal coming out from the optical fiber cable is directly coupled to the optical receiving chip, which not only improves the coupling efficiency, but also avoids the damage caused by the optical receiving chip colliding with external devices.

16 Claims, 3 Drawing Sheets

OPTICAL RECEIVING DEVICE AND OPTICAL MODULE

FIELD

The subject matter herein generally relates to a technical field of optical communications, in particular to an optical receiving device and an optical module.

BACKGROUND

Optical transceivers are configured to transmit and receive optical signals for various applications, including Internet data centers, cable television broadband, and fiber to the home (FTTH) applications, etc. The optical transceivers may include a transmitter optical subassemblies (TOSA) and a receiver optical subassemblies (ROSA) for sending and receiving optical signals. The light coupled to the optical receiving chip by the traditional optical receiving module is reflected by a 45-degree surface of the demultiplexing (DEMUX) chip and then coupled to the optical receiving chip, however, there is an angle of no more than 8 degrees between the light being transmitted in the optical fiber and the fiber core, which affects the optical coupling efficiency, and it is easy to damage the light receiving chip during a coupling process.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1A:
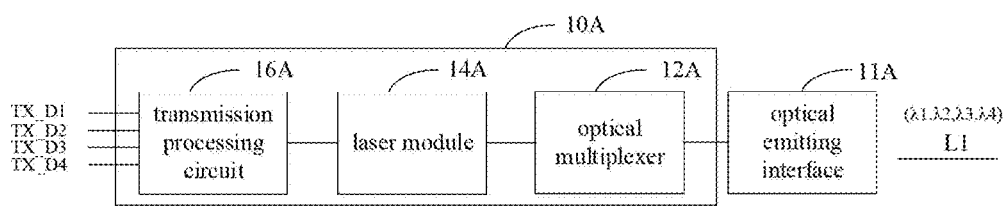
FIG. 1A is a schematic block diagram of an optical emitting device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1B:
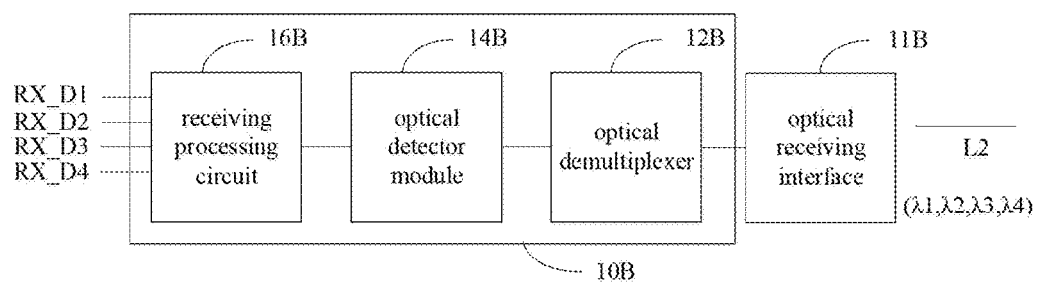
FIG. 1B is a schematic block diagram of an optical receiving device according to an embodiment of the present disclosure.

FIG. 1A is a schematic block diagram of an optical emitting device according to an embodiment of the present disclosure. In the embodiment, the optical emitting device includes an optical emitting interface 11A and a transmitter optical subassembly 10A. The transmitter optical subassembly 10A includes a transmission processing circuit 16A, a laser module 14A, and an optical multiplexer 12A. The optical emitting device is connected to an optical fiber cable through the optical emitting interface 11A. FIG. 1B is a schematic block diagram of an optical receiving device according to an embodiment of the present disclosure. In the embodiment, the optical receiving device includes an optical receiving interface 11B and a receiver optical subassembly 10B. The receiver optical subassembly 10B includes an optical demultiplexer 12B, an optical detector module 14B, and a receiving processing circuit 16B. The optical receiving device is connected to an optical fiber cable through the optical receiving interface 11B. In the embodiment, the optical emitting interface 11A and optical receiving interface 11B can be ST type, SC type, FC type, LC type, etc.

The dense wavelength division multiplexing (DWDM) technology has characteristics of bandwidth and low loss of single-mode fiber, which uses multiple wavelengths as carriers, allowing each carrier channel to transmit simultaneously in the fiber. In the embodiment, the present disclosure utilizes a dense wavelength division multi task technology to enable the optical module device to use four channels to receive or transmit four different channel wavelengths ($\lambda 1$, $\lambda 2$, $\lambda 3$, $\lambda 4$), so an optical signal L1 transmitted by the optical emitting interface 11A can have four wavelengths: $\lambda 1$, $\lambda 2$, $\lambda 3$, $\lambda 4$, etc. and an optical signal L2 received by the optical receiving interface 11B can have four wavelengths: $\lambda 1$, $\lambda 2$, $\lambda 3$, $\lambda 4$, etc. The number of optical detection components of the optical detector 14B and laser components of the laser module 14A also correspond to the number of channels. Although the embodiment takes four channel configurations as an example, other channel configurations (for example, 2, 8, 16, 32, etc.) are also within the scope of the present disclosure.

Referring to FIG. 1A, electrical data signals (TX_D1 to TX_D4) received by the transmission processing circuit 16A are output to the laser module 14A after a conversion processing, and the laser module 14A modulates the received electrical data signals into optical signals. The laser module 14A can include a single or multiple vertical cavity surface emitting laser diodes (VCSEL), or surface emitting laser diodes. Multiple vertical cavity surface emitting laser diodes form an array and are driven by a driving chip to emit optical signals. In other embodiments, other elements that can be used as light sources can also be used, such as light emitting diodes (LED), edge emitting laser diodes (EELD), distributed feedback laser (DFB) lasers with diffraction gratings, or electro-absorption modulated laser (EML) laser diode packages. The optical multiplexer 12A converts the modulated optical signals corresponding to the electrical data signals (TX_D1 to TX_D4) to an optical signal L1 including the wavelengths of λ1, λ2, λ3, λ4, etc., which is transmitted to optical emitting interface 11A to output to the optical fiber cable.

Referring to FIG. 1B, the optical signal L2 is transmitted to the optical demultiplexer 12B via the optical receiving interface 11B. In the embodiment, the optical demultiplexer 12B divides the optical signal L2 into optical signals corresponding to wavelengths of λ1, λ2, λ3, λ4 (in the embodiment, four as an example, but not limited to). by the thin film filter (TFF) technology. The optical detector 14B detects optical signals and generates corresponding electrical signals. In the embodiment, the optical detector 14B can include a PIN (P-doped-intrinsic-doped-N) diode or an avalanche photodiode (APD). After the electrical signal generated by the optical detector 14B is processed by an amplification circuit (such as a trans impedance amplifier (TIA)) and a conversion circuit of the receiving processing circuit 16B, the electrical data signals transmitted by the optical signal L2 (such as RX D1 to RX D4) can be obtained. In other embodiments of the present disclosure, the optical demultiplexer 12B can also convert optical signal L2 into optical signals of different wavelengths by using fiber bragg grating (FBG) and other related technologies.

In the embodiment, both the transmitter optical subassembly 10A and the receiver optical subassembly 10B are included in an optical module, and the transmitter optical subassembly 10A and the receiver optical subassembly 10B can also include other functional circuit elements, such as a laser driver used to drive the laser module 14A, an automatic power control (APC), a monitor photo diode (MPD) used to monitor a laser power, and other circuit elements necessary for implementing the optical signal transmission function, receiving optical signals and processing, as well as digital signal processing integrated circuits used to process the electrical signals transmitted from the receiver optical subassembly 10B and the electrical signals to be transmitted to the transmitter optical subassembly 10A, which are well known to those skilled in the art, and will not be repeated here for simplified description.

Figure 2:
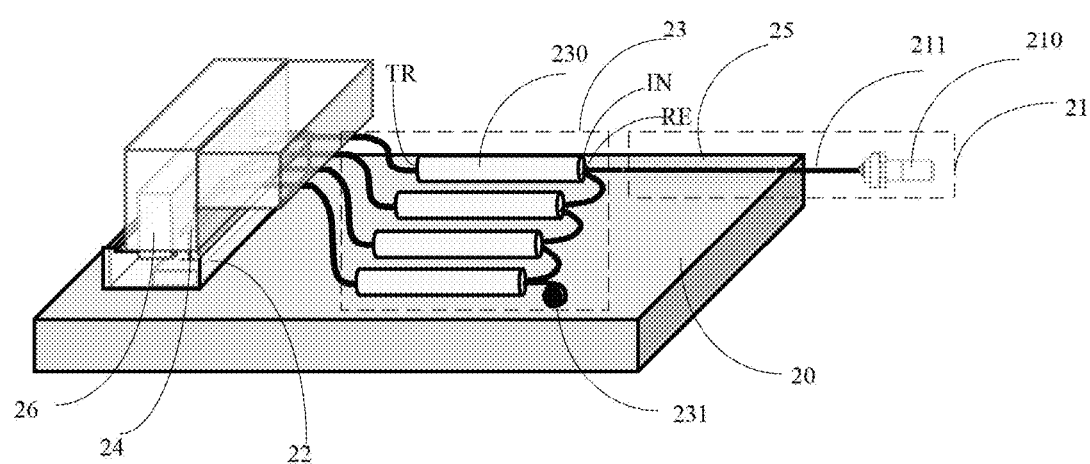
FIG. 2 is a schematic structural diagram of an optical receiving device according to an embodiment of the present disclosure.

FIG. 2 is a schematic structural diagram of the optical receiving device according to an embodiment of the present disclosure. As shown in FIG. 2, the optical receiving device according to an embodiment of the present disclosure includes a substrate 20, an optical transmission member 21, an optical receiving chip 22, an optical demultiplexer 23, and an optical fiber array 24. The optical transmission member 21 includes an optical receiving interface 210 and an optical fiber cable 211. The optical fiber cable 211 is arranged on the substrate 20. In the embodiment, the substrate 20 has a holding slot 25, which extends towards the input end of the optical demultiplexer 23 and is aligned with the input end of the optical demultiplexer 23. In the embodiment, the holding slot 25 can be a U-shaped slot or a V-shaped slot for placing the optical fiber cable 211. The optical cable 24 and the holding slot 25 can be fixed through an adhesive layer. In addition, the size of the holding slot 25 can be designed according to a wire diameter of the optical fiber cable 211. In other embodiments, an outer insulating layer of the optical fiber cable 211 placed at the holding slot 25 can be peeled off to reduce the size of the holding slot 25. In the embodiment, a cover plate (not shown in the figure) can also be arranged on the holding slot 25 and cover a part of the optical fiber cable 211 to protect the optical fiber cable 211.

The optical receiving interface 210 is optically coupled to the optical demultiplexer 23 through the optical fiber cable 211. The optical fiber cable 211 is configured to transmit the optical signal received by the optical receiving interface 210 to the optical demultiplexer 23. The optical demultiplexer 23 divides the received optical signal into optical signals of different wavelengths and transmits to the optical receiving chip 22. Wavelength division multiplexing (WDM) is a technology that combines two or more optical carrier signals of different wavelengths (carrying various information) at a sending end through a multiplexer, and couple to a same optical fiber of the optical line for transmission. At the receiving end, optical carriers of various wavelengths are separated by a demultiplexer (also called a splitter or wave divider), and then further processed by the optical receiver to recover the original signal. The technology of transmitting two or more different wavelength optical signals in the same fiber is called wavelength division multiplexing. The basic element of WDM transmission is optical filter, which can be realized through technologies such as fused biconical tape (FBT), thin film filter (TFF), arrayed waveguide grating (AWG) and optical comb filter.

In the embodiment, the optical receiving chip 22 is arranged on the substrate 20. The optical receiving chip 22 is pasted on the substrate 20 through the die bonding process, and electrical connection procedures such as wire bonding, tape automated bonding (TAB), and flip chip (FC) are performed on the optical receiving chip 22. The substrate 20 can be made of different materials, such as plastic materials, epoxy materials, composite materials, FR-4 materials or ceramic materials. It is well known to those skilled in the art that the substrate 20 has a pre-designed interconnect structure, a printed circuit formed by screen printing, and circuit elements necessary to implement the optical signal transmission or reception function, which will not be repeated here for brief description.

In the embodiment, the optical demultiplexer 23 is a dielectric thin film optical demultiplexer, including a plurality of three port devices 230, and each three port device includes an input end IN, a transmission end TR, and a reflection end RE. In the embodiment, taking four three port devices as an example, it can be understood that the number of the three port devices can be determined according to actual needs, and there is no limit here. As shown in FIG. 2, in order to demultiplex all wavelengths, four three port devices need to be connected in series, that is, the transmission end TR of each three port device 230 is connected with the input end IN of a next three port device 230 through an optical fiber cable. The input end IN of a first three port device 230 receives the optical signal through an optical fiber cable. The optical fiber cable at the transmission end RE of a last three port device 230 is tied with a knot 231, and a diameter of the knot 231 is less than 6 mm. The transmission wavelength of a TFF filter in each three port device 230 is different. Different wavelengths pass through different number of the three port WDM devices, so different insertion losses are generated. As the number of ports increases, the loss uniformity deteriorates. Therefore, the maximum loss at the last port is a factor limiting the number of ports.

In the embodiment, the optical fiber cable at the transmission end RE of each three port device of the optical demultiplexer 23 is fused with the optical fiber cable at the input end of the optical fiber array 24, so that the optical signal coming out of the optical fiber cable is directly coupled to the optical receiving chip 22, without coupling the demultiplexer chip through the 45 degree plane of the optical receiving chip, which not only improves the coupling efficiency, but also avoids that the multiplexer chip cracks and damages the optical receiving chip.

In the embodiment, the optical fiber array 24 is a 90-degree optical fiber array, and an optical fiber cable sequence of the optical fiber array is consistent with a receiving wavelength sequence of the optical receiving chip 22. A wavelength of the transmission end of the optical demultiplexer 23 is consistent with a wavelength of an output end of the optical fiber array 24.

In the embodiment, the optical receiving device further includes a support structure 26, pasted on a periphery of the optical receiving chip 22 through the die bonding process. The optical fiber array 24 is buckled on the support structure 26.

When assembling the optical receiving device, first, the optical receiving chip 22 is pasted on the substrate 20 through the die bonding process, and then the optical receiving chip 22 is electrically connected through the wire bonding, automatic tape rolling bonding, cladding bonding and other procedures; next, the support structure 26 is pasted to the periphery of the optical receiving chip 22 by the die bonding process according to marker points; further, after ensuring that the optical cable sequence of the optical fiber array 24 is consistent with the receiving wavelength sequence of the optical receiving chip 22, and the wavelength of the transmission end of the optical demultiplexer 23 is consistent with the wavelength of the output end of the optical array 24, the optical fiber cable at the transmission end of each three port device 230 of the optical demultiplexer 23 is directly fused with the optical cable at the input end of the optical array 24, so that the optical signal coming out of the optical cable is directly coupled to the optical receiving chip 22; then the optical fiber cable at the transmission end RE of a last three port device 230 is tied with a knot 231; finally, the optical fiber array 24 is directly buckled onto the support structure 26 around the optical receiving chip 22.

According to the optical receiving device described in the embodiment of the present disclosure, the optical cable of the optical demultiplexer is directly fused with the optical cable of the optical array, the optical cable sequence of the optical array is consistent with the receiving wavelength sequence of the optical receiving chip, and the wavelength of the transmission end of the optical demultiplexer is consistent with the wavelength of the output end of the optical array, so that the optical signal is directly coupled to the optical receiving chip from the optical cable. Compared with the traditional coupling between the demultiplexer chip and the optical receiver chip through the 45 degree plane, it not only improves the coupling efficiency, but also avoids the damage caused by the optical receiver chip colliding with external devices.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical receiving device, comprising:
   a substrate;
   an optical receiving chip, arranged on the substrate;
   an optical demultiplexer, arranged on the substrate and configured to distinguish optical signals into optical signals with different wavelengths;
   an optical transmission structure, optically coupled to the optical demultiplexer and providing the optical signals to the optical demultiplexer; and
   an optical fiber array, fused with optical fibers of the optical demultiplexer, and transmitting the optical signals with different wavelengths to the optical receiving chip;
   wherein the optical fiber array is a 90-degree optical fiber array, and an optical fiber cable sequence of the optical fiber array is consistent with a receiving wavelength sequence of the optical receiving chip.

2. The optical receiving device according to claim 1, wherein the optical receiving chip is pasted on the substrate through a die bonding process.

3. The optical receiving device according to claim 1, wherein the optical demultiplexer is a thin film optical demultiplexer, comprising a plurality of three-port devices, wherein each three-port device comprises an input end, a transmission end and a reflection end.

4. The optical receiving device according to claim 3, wherein the transmission end of each three-port device is connected to the input end of a next three-port device through an optical fiber cable;
   the input end of the first three-port device receives the optical signal through the optical fiber cable;
   the optical fiber cable at the transmission end of a last three-port device is knotted.

5. The optical receiving device according to claim 3, wherein the optical fiber cable at the transmission end of each three port device of the optical demultiplexer is fused with the optical fiber cable at the input end of the optical fiber array.

6. The optical receiving device according to claim 1, wherein a wavelength of the transmission end of the optical demultiplexer is consistent with a wavelength of an output end of the optical fiber array.

7. The optical receiving device according to claim 1, further comprising a support structure, pasted on a periphery of the optical receiving chip through a die bonding process.

8. The optical receiving device according to claim 7, wherein the optical fiber array is buckled on the support structure.

9. An optical module, comprising an optical receiving device, wherein the receiving device comprises:
   a substrate;
   an optical receiving chip, arranged on the substrate;
   an optical demultiplexer, arranged on the substrate and configured to distinguish optical signals into optical signals with different wavelengths;
   an optical transmission structure, optically coupled to the optical demultiplexer and providing the optical signals to the optical demultiplexer; and
   an optical fiber array, fused with optical fibers of the optical demultiplexer, and transmitting the optical signals with different wavelengths to the optical receiving chip;

wherein the optical fiber array is a 90-degree optical fiber array, and an optical fiber cable sequence of the optical fiber array is consistent with a receiving wavelength sequence of the optical receiving chip.

10. The optical module according to claim 9, further comprising a support structure, pasted on a periphery of the optical receiving chip through a die bonding process.

11. The optical module according to claim 10, wherein the optical fiber array is buckled on the support structure.

12. The optical module according to claim 9, wherein the optical demultiplexer is a thin film optical demultiplexer, comprising a plurality of three-port devices, wherein each three-port device comprises an input end, a transmission end and a reflection end.

13. The optical module according to claim 12, wherein the transmission end of each three-port device is connected to the input end of a next three-port device through an optical fiber cable;

the input end of the first three-port device receives the optical signal through the optical fiber cable;

the optical fiber cable at the transmission end of a last three-port device is knotted.

14. The optical module according to claim 12, wherein the optical fiber cable at the transmission end of each three port device of the optical demultiplexer is fused with the optical fiber cable at the input end of the optical fiber array.

15. The optical module according to claim 9, wherein a wavelength of the transmission end of the optical demultiplexer is consistent with a wavelength of an output end of the optical fiber array.

16. The optical module according to claim 9, wherein the optical receiving chip is pasted on the substrate through a die bonding process.

* * * * *